United States Patent [19]

Nakamura

[11] Patent Number: 4,731,781
[45] Date of Patent: Mar. 15, 1988

[54] RECEIVER OF A DIGITAL COMMUNICATION APPARATUS

[75] Inventor: Aki Nakamura, Nagaokakyo, Japan

[73] Assignee: Mitsubishi Denki Kabushiki Kaisha, Tokyo, Japan

[21] Appl. No.: 886,093

[22] Filed: Jul. 16, 1986

[30] Foreign Application Priority Data

Jul. 16, 1985 [JP] Japan ................................. 60-157290

[51] Int. Cl.$^4$ ........................ H04J 15/00; H03K 1/18
[52] U.S. Cl. ............................................ 370/9; 375/22
[58] Field of Search .................. 370/9, 8, 100; 375/22

[56] References Cited

U.S. PATENT DOCUMENTS 4,051,539  9/1977  Geddes et al. ........................... 370/9
4,626,923  12/1986  Yoshida ................................. 375/22
4,217,572  8/1980  Giraud ..................................... 370/9

Primary Examiner—Robert L. Griffin
Assistant Examiner—Frank M. Scutch, II
Attorney, Agent, or Firm—Birch, Stewart, Kolasch & Birch

[57] ABSTRACT

A receiver for a digital communication apparatus which utilizes a time division multiplexed signal of a single or a plurality of pulse width modulation signal(s) and a synchronous signal or of a plurality of pulse width modulation signals, includes: a signal separation circuit including flip-flops and logic gates for separating each said pulse width modulation signal and said synchronous signal or separating each said pulse width modulation signal, from said time division multiplexed signal.

4 Claims, 8 Drawing Figures

F I G .3.
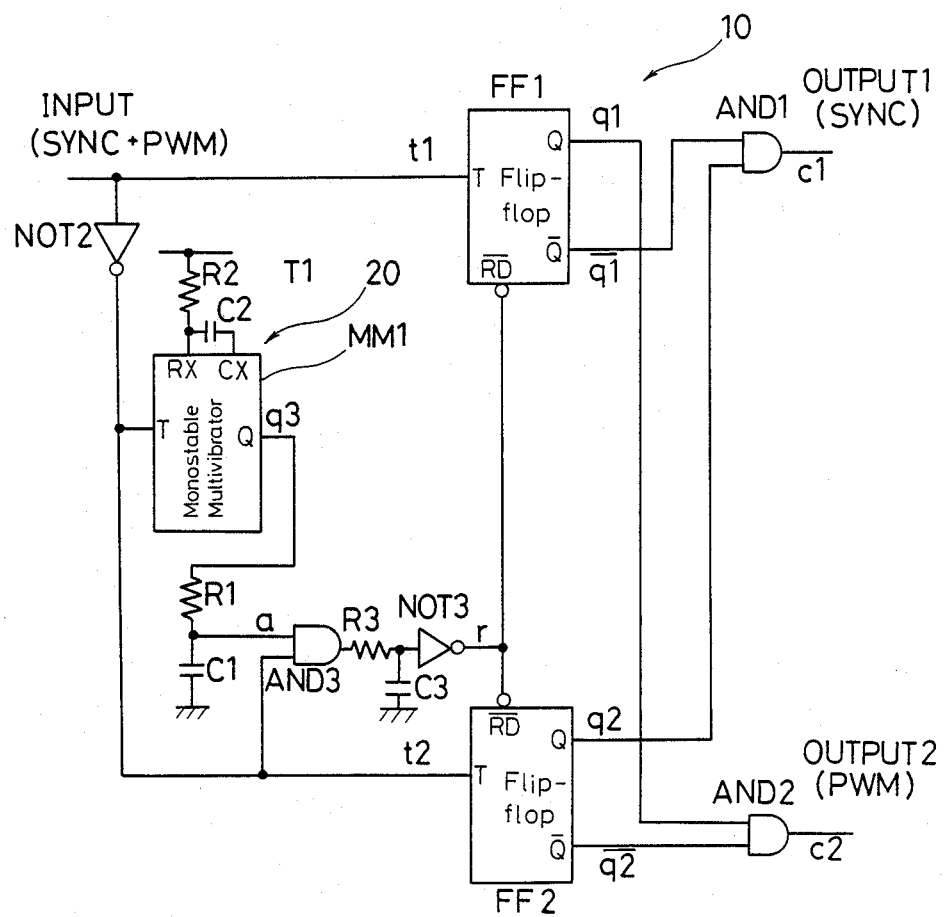

FIG. 5.

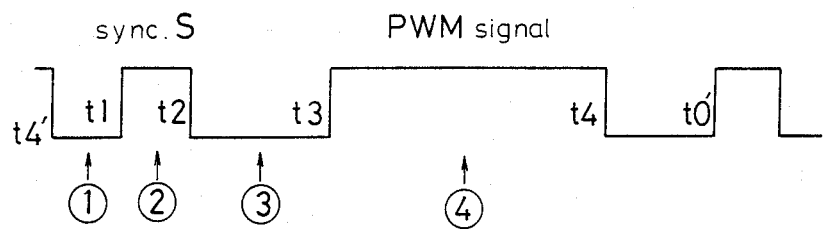

① direct before the sync. S (t4'-t1)

② in the way of the sync. S (t1-t2)

③ direct after the sync. S (t2-t3)

④ in the way of the PWM signal (t3-t4)

| timing | decoding outputting the sync. S | decoding outputting the PWM signal |
|---|---|---|
| ① | $q1 \cdot \overline{q2}$ | $\overline{q1} \cdot q2$ |
| ② | $\overline{q1} \cdot \overline{q2}$ | $q1 \cdot q2$ |
| ③ | $\overline{q1} \cdot q2$ | $q1 \cdot \overline{q2}$ |
| ④ | $q1 \cdot q2$ | $\overline{q1} \cdot \overline{q2}$ |

FIG. 8.
(a) positive edge trigger type FF
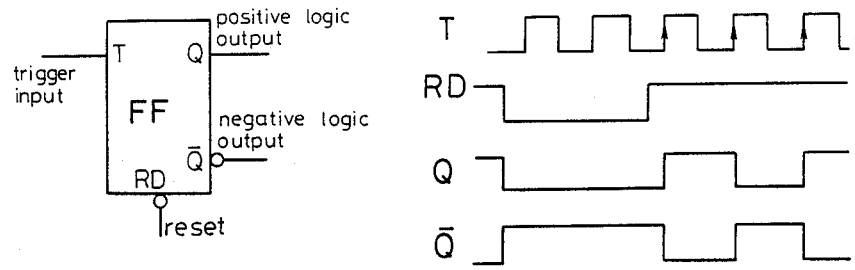
(b) Monostable Multivibrator (MM)
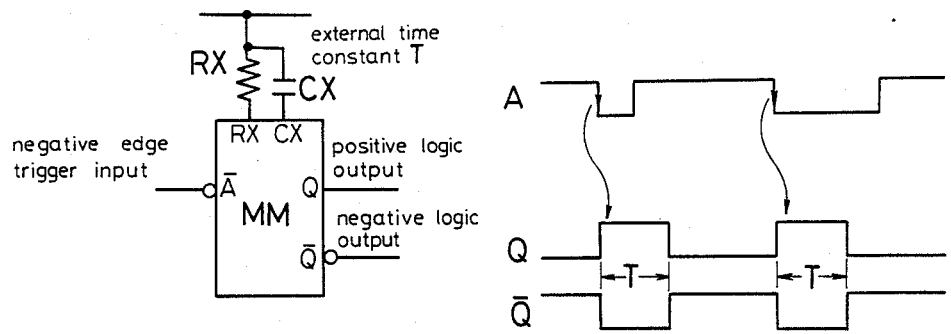
(c) AND
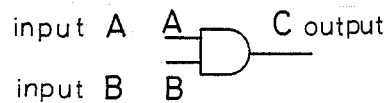
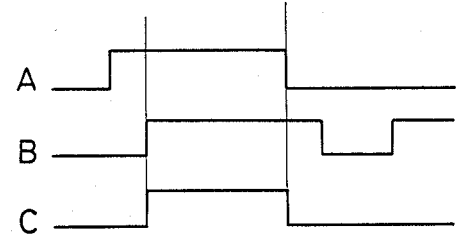
(d) NOT
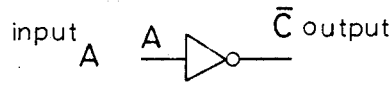
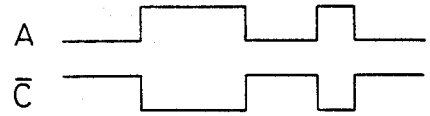

RECEIVER OF A DIGITAL COMMUNICATION APPARATUS

FIELD OF THE INVENTION

The present invention relates to a receiver for a digital communication apparatus used in a transmission of digital signals, and more particularly to a receiver effectively used in a transmission of pulse width modulation signals for transmitting continuous information.

BACKGROUND OF THE INVENTION

In general, a digital signal is a signal used for transmission of information which utilizes a two value logic of a high or the low level of a voltage, or existence or non-existence of a current. In transmitting continuous information utilizing such a digital signal a pulse width modulation signal (hereinafter referred to as a "PWM signal") is widely used thereby to simplify the receiver. This is because an analog signal simply can be easily obtained from the PWM signal by integrating the pulses which are transmitted continuously, that is, by passing the same through a low pass filter.

When the PWM signal is used, the receiver has a simplified construction as described above, but it becomes necessary to read out the information to be transmitted at the period of the PWM signal at the transmitter's side. This is ineffective in view of the advantageous utilization of the transmission path because a PWM signal always occupies a transmission path. In other words, in order to transmit a plurality of analog information signals, that number of transmission paths are required.

SUMMARY OF THE INVENTION

An object of the present invention is to provide an improved receiver of a digital communication apparatus capable for utilizing a transmission path effectively.

Other objects and advantages of the present invention will become apparent from the detailed description given hereinafter; it should be understood, however, that the detailed description and specific embodiments are given by way of illustration only, since various changes and modifications within the spirit and scope of the invention will become apparent to those skilled in the art from this detailed description.

According to the present invention, there is provided a receiver for a digital communication apparatus which utilizes a time division multiplexed signal of a single or a plurality of pulse width modulation signal(s) and a synchronous signal of a plurality of pulse width modulation signals, comprising: a signal separation means including flip-flops and logic gates for separating each said pulse width modulation signal and said synchronous signal or separating each said pulse width modulation signal from said time division multiplexed signal.

BRIEF DESCRIPTION OF THE DRAWINGS

FIG. 3 is the diagram showing a construction of another embodiment of the present invention;

FIG. 5 is a diagram showing the manners of decoding at various timings of the reset;

FIG. 8 is a diagram showing the operations of the elements used in the embodiments of FIGS. 1, 3, and 6.

DETAILED DESCRIPTION OF THE PREFERRED EMBODIMENTS

Figure 1:
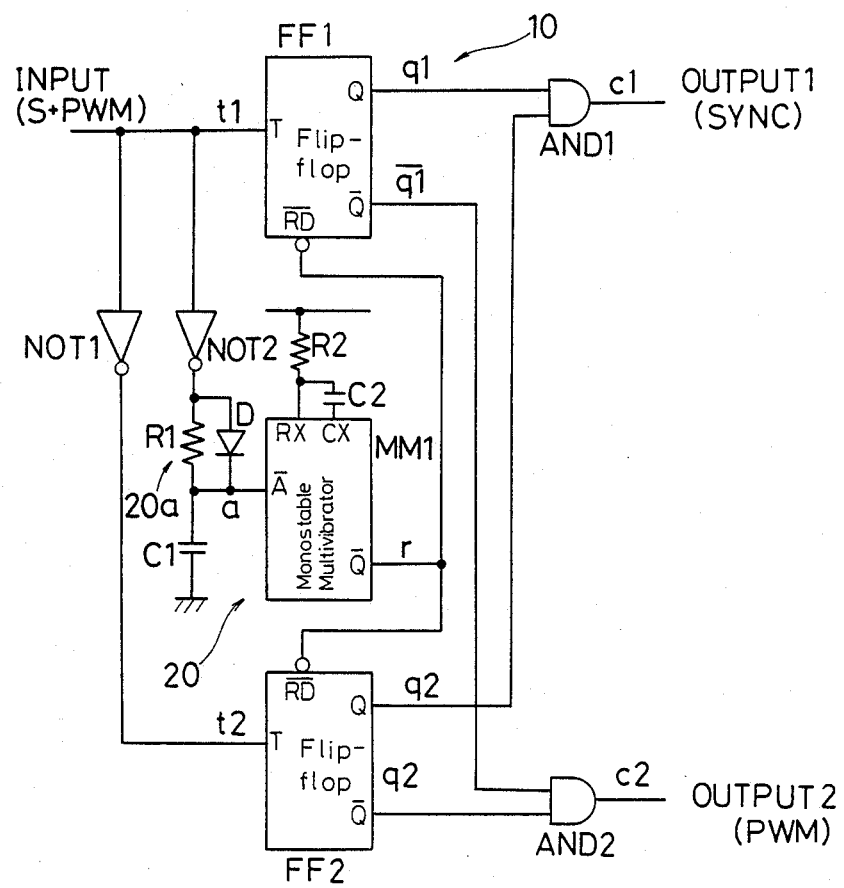
FIG. 1 is the diagram showing a construction of a receiver for a digital communication apparatus as a first embodiment of the present invention.

In order to explain the present invention in detail, reference will be particularly made to FIG. 1.

In FIG. 1, the reference characters FF1 and FF2 designate positive edge trigger type flip-flops, the reference character MM1 designates a negative edge trigger type monostable multivibrator, the reference characters AND1 and AND2 designate AND gates, and the reference characters NOT1 and NOT2 designate inverters. The operations of these elements are shown in FIG. 8.

The reference numeral 10 designates a signal separation means comprising the flip-flops FF1 and FF2, the inverter NOT1, and the AND gates AND1 and AND2 for separating a synchronous signal and a single or a plurality of PWM signals for each other, or separating a plurality of PWM signals from each other. The reference numeral 20 designates a reset means comprising the monostable multivibrator MM1, the inverter NOT2, a resistor R1, a condenser C1, and a diode D for resetting the flip-flops FF1 and FF2 at each period of the time division multiplexed signal. The reference character R2 designates a resistor, and the reference character C2 designates a condenser.

Figure 2:
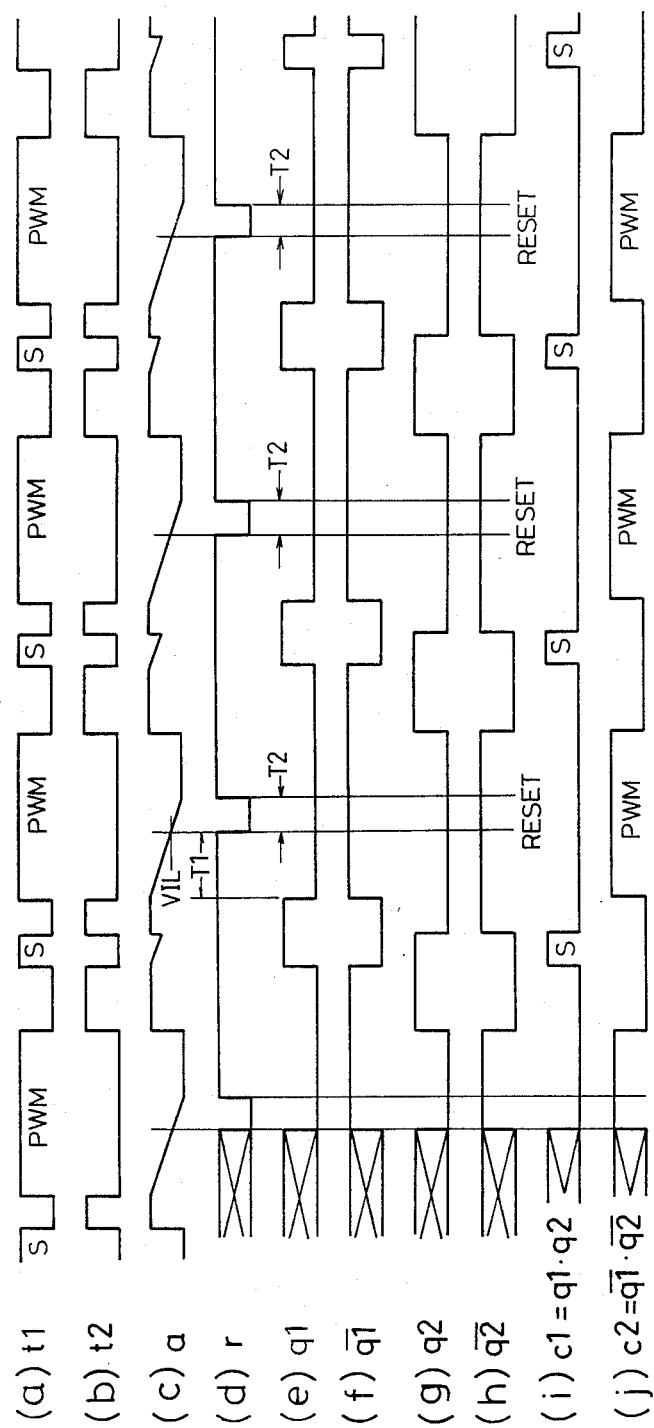
FIG. 2 is a timing chart for explaining the operation of the device of FIG. 1.

The operation of the embodiment shown in FIG. 1 will now be described. In FIG. 1, an input signal obtained by multiplexing a single PWM signal with a synchronous signal S is input to the input terminal INPUT. This signal is shown in FIG. 2(a) as t1. This input signal t1 triggers the flip-flop FF1. This input signal t1 is also inverted to a signal t2 by the inverter NOT1 and this signal t2 triggers the flip-flop FF2 (refer to FIG. 2(b)). The output $q1/\overline{q1}$ from the flip-flop FF1 and the output $q2/\overline{q2}$ from the flip-flop FF2 are decoded to generate outputs $c1=q1 \cdot q2$ and $c2=\overline{q1} \cdot \overline{q2}$ by the AND gates AND1 and AND2. Herein, a synchronous signal S is produced as the decoded output c1, and a PWM signal is produced as the decoded output c2.

On the other hand, the input signal t1 passes through the inverter NOT2 and a time constant circuit having a directionality 20a determined by the diode D, the resistor R1, and the condenser C1, thereby resulting in a waveform a shown in FIG. 2(c). This waveform a becomes low level when the input signal t1 is kept at a high level for a sufficiently long time, and at the time it becomes low level the monostable multivibrator MM1 is triggered. The pulse r which is output from the monostable multivibrator MM1 by this trigger is used as reset pulses for the flip-flops FF1 and FF2.

In this embodiment, the fact that the PWM signal is substantially longer than the synchronous signal is utilized, and the reset is conducted by way of the PWM signal. In other words, the outputs of the flip-flops FF1 and FF2 are reset to the state where q is high and $\overline{q}$ is low by way of the PWM signal once during each period of the time division multiplexed signal comprising the synchronous signal and the PWM signal. Thus, the timing relationship between the input signal and the output of each flip-flop is fixed to that shown in FIG. 2, and a constantly accurate expected output is generated from the decoding by the AND gates AND1 and AND2 of FIG. 1.

If the device does not have such a reset function, it is impossible to conduct a normal decoding because the start timing of the frequency of the transmitted signal varies dependent on the start timing of the device or the connections of the terminals. The reset function is provided in this embodiment so as to prevent a malfunction which may arise otherwise caused by a single error such as a count error because the flip-flop is conducting at a continuous frequency. The timing of the start of operation of each flip-flop is confirmed by the reset, and the device is recovered from a malfunction which may arise caused by outside turbulence such as noise within a period caused by the reset.

Of course, the minimum pulse width Tmin of the PWM signal should be longer than the sum of the delay T1 by the time constant circuit 20a and the output pulse width T2 of the monostable multivibrator MM1 in order for the reset signal to be produced.

FIG. 3 shows a second embodiment of the present invention which produces a different reset from that of the first embodiment. This embodiment has a reset mechanism for conducting a reset utilizing a fact that the pulse width of the synchronous signal is narrow. In FIG. 3, the reference character AND3 designates an AND gate, the reference character NOT3 designates an inverter, the reference character R3 designates a resistor, and the reference character C3 designates a condenser.

Figure 4:
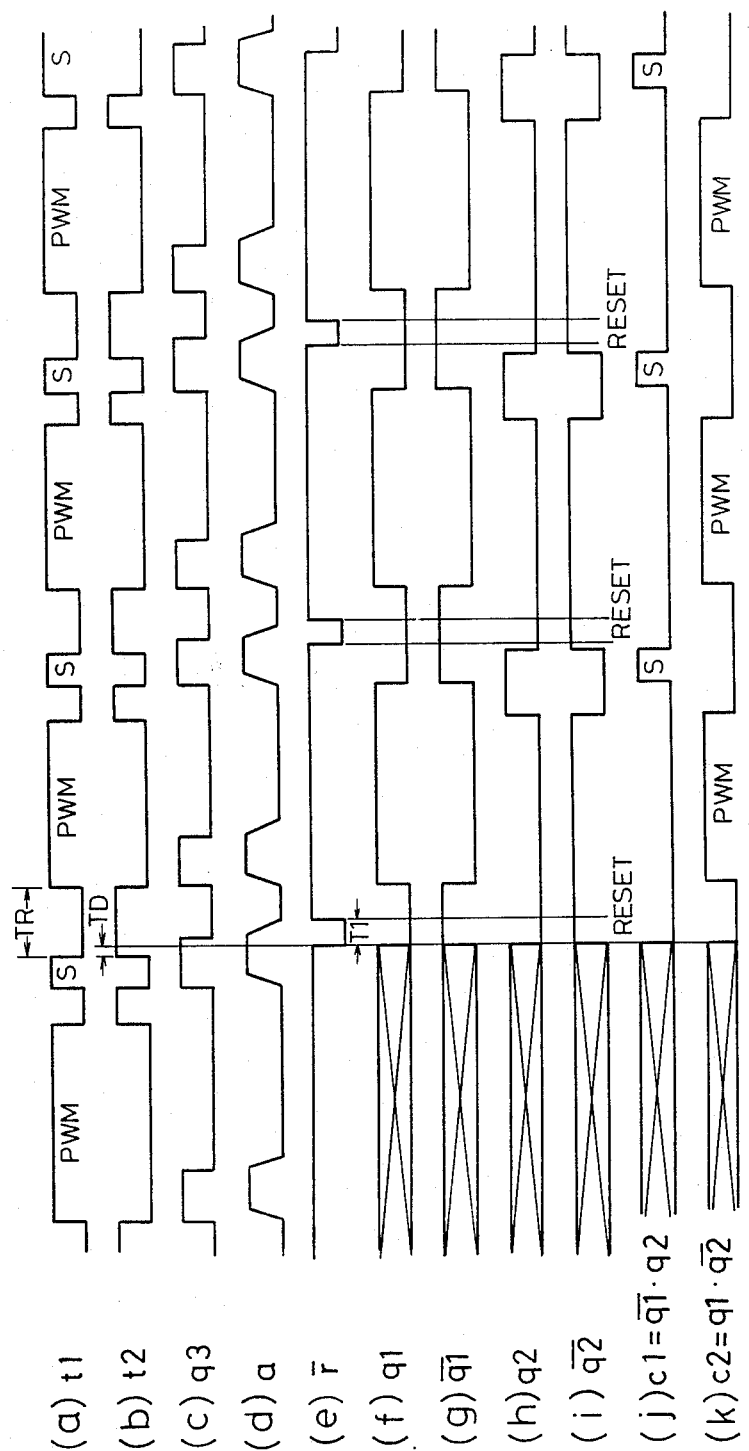
FIG. 4 is a timing chart for explaining the operation of the device of FIG. 3.

In this embodiment, a reset pulse r is generated directly after the synchronous signal S as shown in FIG. 4. It is to be noted that the decoding method for obtaining a synchronous signal as the output c1 and a PWM signal as the output c2 is different from that of the embodiment of FIG. 1. That is, the decoded outputs are $c1 = \overline{q1} \cdot q2$ and $c2 = q1 \cdot \overline{q2}$.

The decoding method is thus different dependent on the timing of the generated reset pulse. FIG. 5 shows this relationship in detail. When the reset is conducted directly before the synchronous signal S the decoded logic c1 (the synchronous signal S) is represented by $c1 = q1 \cdot \overline{q2}$, and the decoded logic c2 (the PWM signal) is represented by $c2 = \overline{q1} \cdot q2$. On the contrary, when the reset is conducted by way of the synchronous signal S the decoded logic c1 is represented by $c1 = \overline{q1} \cdot \overline{q2}$, and the decoded logic c2 is represented by $c2 = q1 \cdot q2$.

It is easily understood that a desired output is obtained by conducting a reset at a desired timing. However, it is important that the reset pulse does not cross an edge of the input signal in any case. This requirement is based on the fact that this circuit utilizes the frequency by edge trigger type flip-flops and that the flip-flops are not operated within the time period when a reset pulse is applied. The operation condition of the circuit of the present invention arises from this requirement. That is, Tmin>T1+T2 in the embodiment of FIG. 1, and TR>TD+T1 in the embodiment of FIG. 3. Herein, TD designates a delay time from the falling edge of the synchronous signal S to the starting edge of the reset pulse, and T1 designates the width of the reset pulse.

Figure 6:
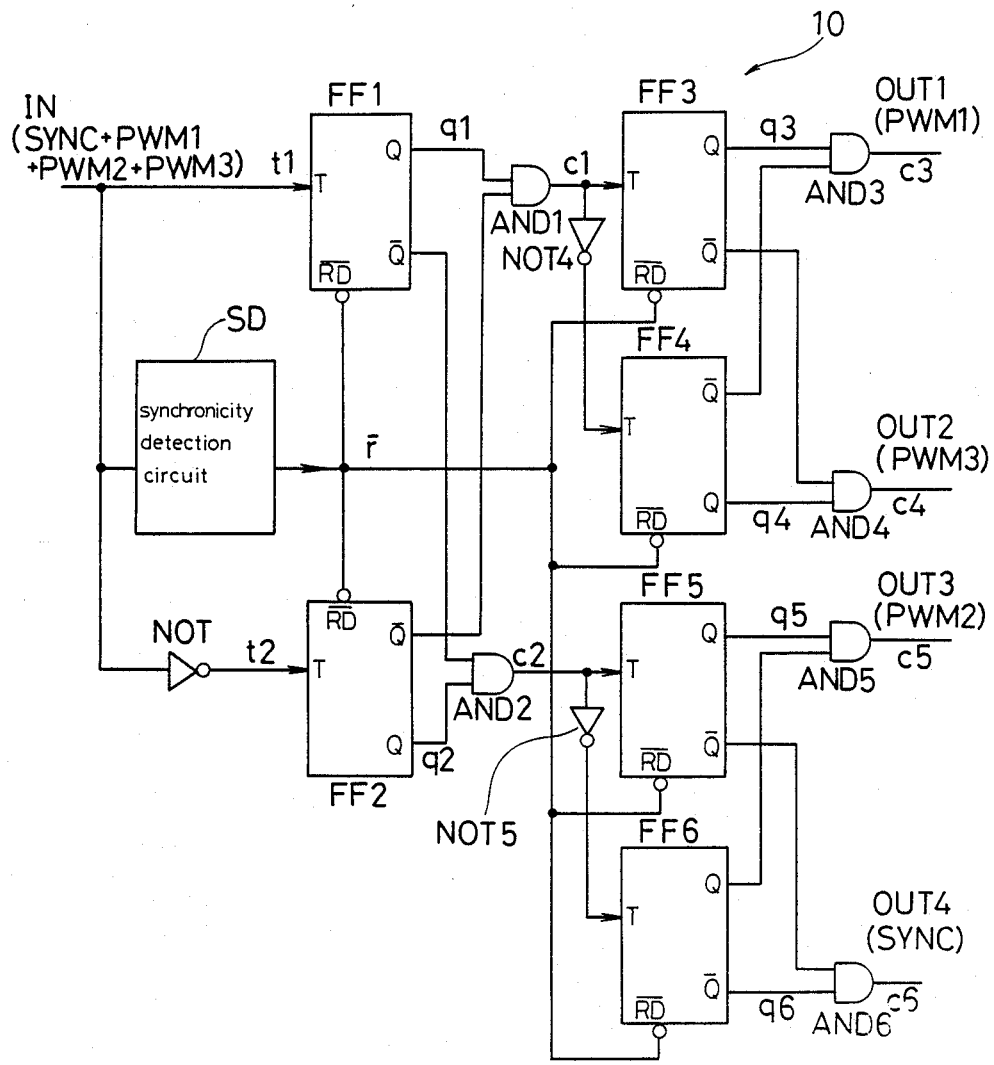
FIG. 6 is the diagram showing a construction of a third embodiment of the present invention.

FIG. 6 shows a third embodiment of the present invention which uses a plurality of PWM signals. In FIG. 6, the reference characters FF1 to FF6 designate flip-flops, the characters AND1 to AND6 designate AND gates, the characters NOT, NOT4, and NOT5 designate inverters, and the character SD designates a synchronicity detection circuit.

Figure 7:
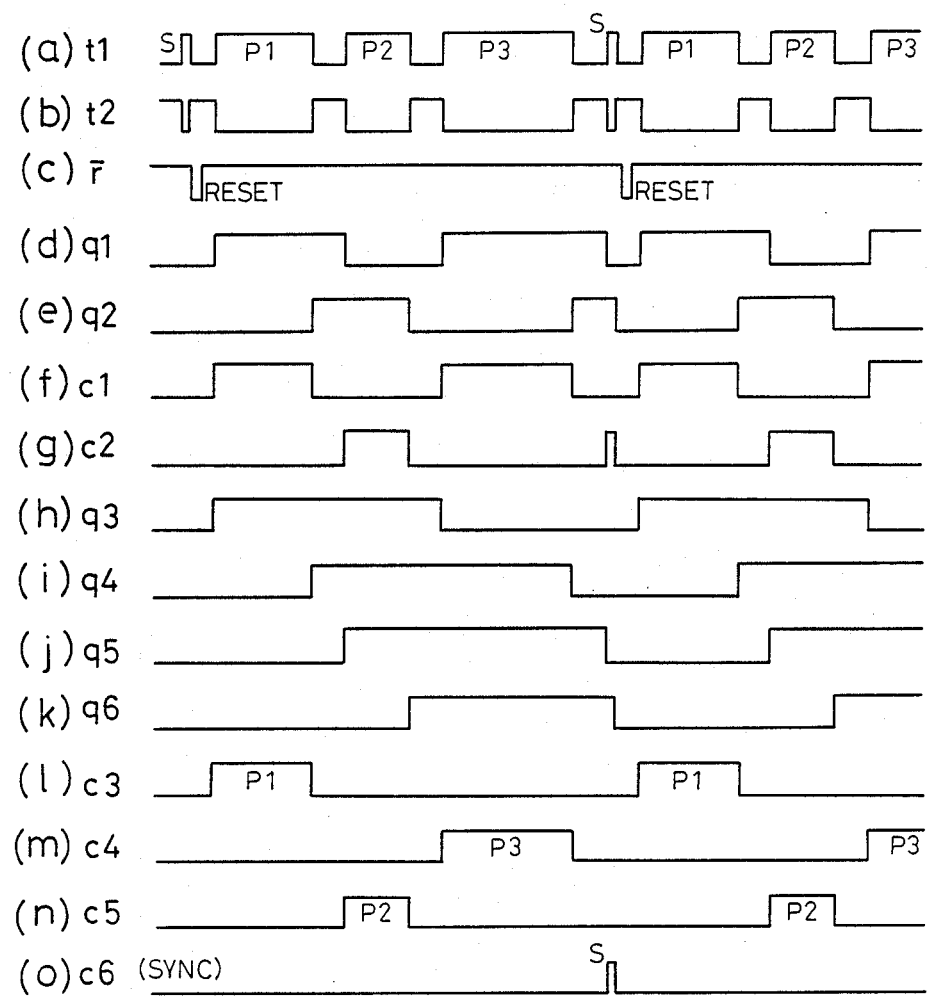
FIG. 7 is a timing chart for explaining the operation of the device of FIG. 6.

In this embodiment a multiplexed signal of the synchronous signal S and three indpendent PWM signals is given to an input signal, and the outputs c1 and c2 are obtained by decoding the output $q1/\overline{q1}$ and $q2/\overline{q2}$ from the positive edge trigger type flip-flop FF1 and the negative edge trigger type flip-flop FF2, respectively. The signal c1 has a multiplexed waveform of the PWM signals P1 and P3, and the signal c2 has a multiplexed waveform of the synchronous signal S and the PWM signal P2 as shown in FIG. 7.

Accordingly, it is possible to obtain the PWM signal P1 as a signal c3, the PWM signal P3 as a signal c4, the PWM signal P2 as a signal c5, and the synchronous signal S as a signal c6 by applying similar processings as described above to the signals c1 and c2 by the flip-flops FF3, FF4 and FF5, FF6 and AND gates AND3, AND4 and AND5, AND6.

The decoding by the AND gates in this embodiment is that in which the reset is conducted directly after the synchronous signal S. That is, the synchronicity detection circuit SC in FIG. 6 is a reset means which resets all the flip-flops FF1 to Ff6 directly after the synchronous signal similarly as the embodiment of FIG. 3.

An application of the present invention to a raster scanning type display device will be described. Such a display device is designed to receive a horizontal synchronous signal (hereinafter referred to as "HD") and a vertical synchronous signal (hereinafter referred to as "VD") continuously at times other than the video information that is displayed on the screen. This raster scanning type is dominant in present color display devices, and the three color (R, G, B) video signals and the synchronous signals HD and VD are generally transmitted through separate transmission paths, respectively.

The apparatus at the transmitter's side of such a display device is usually a digital device such as a personal computer, and has a function of reading out the content of a memory storing video information at the periods of the HD and VD so as to enable of the operation the raster scanning method.

In a video display system including an analog type display device at the receiver's side and main digital unit at the transmitter's side, when the display device is analog-controlled by the main unit or when transmission of an analog signal is conducted, the scale of alteration of the system is limited to a minimum by transmission of a multiplexed signal of an analog information in the form of a PWM signal and the HD or VD signals through the existing transmission paths provided corresponding to the HD and VD. In detail, it is possible to produce such a PWM signal easily because the main unit (digital device) at the transmitter's side already performs a function of reading out the internal memory in accordance with the HD and VD signals. In addition, it is possible to obtain a required analog voltage easily by separating and decoding the multiplexed signal with the use of only a simple receiver and an integrator of the present invention at the receiver's side, whereby the signals can be multiplex-transmitted with utilizing the existing transmission paths for the HD and VD signals without an expansion of a transmission path.

In conducting such a transmission, the possible range of the speed of the transmitted signal is restricted by the period of the PWM signal, and it cannot exceed ½ of the horizontal synchronous signal frequency fH or the vertical synchronous signal frequency fV. However, such a transmission bandwidth and control speed may be usually sufficient. For example, an audio signal multiplexed with an HD of 15 to 31 kHz, and analog signals such as a brightness signal, a contrast signal, and a screen width signal multiplexed with a VD of 50 to 60 Hz can be satisfactorily transmitted.

The receiver of a digital communication apparatus according to the present invention operates based on the frequency of the flip-flops, independently of the frequencies fH and fV as sampling frequencies which determine the period of the PWM signal, and it operates normally even where the frequencies fH and fV usually vary.

As is evident from the foregoing description, according to the present invention, a plurality of PWM signals and a synchronous signal which are time division multiplexed and distinguished from each other by their order of appearance, can be separated by a circuit of a simple construction. Accordingly, it is possible to utilize the transmission path effectively and to control analog devices successively by a digital device or to conduct a transmission of analog information effectively and economically without an expansion of transmission path. Furthermore, in the receiver of the present invention flip-flops are reset at each period of the transmission signals, whereby a system of conducting a stable operation is obtained.

What is claimed is:

1. A receiver for a digital communication apparatus utilizing a time-division multiplexed signal in which a plurality of pulse signals of different types are time-division multiplexed, comprising:

signal separation means for separating said pulse signals into said different types, including,
        first flip-flop means, responsive to leading edges of said plurality of pulse signals, for producing a first output waveform,
        second flip-flop means, responsive to leading edges of a plurality of pulse signals of an inverted time-division multiplexed signal, for producing a second output waveform, and
        logic gate means, responsive to the output waveforms of said first and second flip-flop means, for producing output signals corresponding to each different type of pulse signal at respective output terminals thereof; and
    reset pulse generator means for providing reset pulses to said first and second flip-flop means, including means for producing said reset pulses at intervals corresponding to the period of said plurality of pulse signals, said reset pulses being produced between respective starting and falling edges of said plurality of pulse signals.

2. A receiver for a digital communication apparatus as set forth in claim 1, wherein said different types of pulse signals comprise a synchronous signal and at least one pulse width modulation signal.

3. A receiver for a digital communication apparatus as set forth in claim 2, wherein said different types of pulse signals comprise a plurality of pulse width modulation signals.

4. A receiver for a digital communication apparatus as set forth in claim 1, wherein said logic gate means comprises a plurality of AND gates having respective inputs coupled to respective output waveforms of said first and second flip-flop means and producing said output signals at respective output terminals thereof.

* * * * *